United States Patent
Graveston et al.

(10) Patent No.: US 7,720,338 B2
(45) Date of Patent: May 18, 2010

(54) OPTICAL FIBER CABLES

(75) Inventors: Mark G. Graveston, Newport (GB); Jason Pedder, Chepstow (GB); Peter A. Weimann, Atlanta, GA (US)

(73) Assignee: Furukawa Electric North America, Norcross, GA (US)

( * ) Notice: Subject to any disclaimer, the term of this patent is extended or adjusted under 35 U.S.C. 154(b) by 0 days.

(21) Appl. No.: 11/903,779

(22) Filed: Sep. 25, 2007

(65) Prior Publication Data

US 2008/0285925 A1 Nov. 20, 2008

Related U.S. Application Data

(60) Provisional application No. 60/917,953, filed on May 15, 2007.

(51) Int. Cl.
*G02B 6/44* (2006.01)

(52) U.S. Cl. ........ 385/100; 385/128

(58) Field of Classification Search ........ 385/99–100, 385/109, 113–141
See application file for complete search history.

(56) References Cited

U.S. PATENT DOCUMENTS

| | | | | |
|---|---|---|---|---|
| 4,078,853 A * | 3/1978 | Kempf et al. | ........ | 385/114 |
| 4,552,433 A * | 11/1985 | Titchmarsh et al. | ........ | 385/107 |
| 4,844,575 A * | 7/1989 | Kinard et al. | ........ | 385/113 |
| 5,109,457 A * | 4/1992 | Panuska et al. | ........ | 385/102 |
| 5,125,063 A * | 6/1992 | Panuska et al. | ........ | 385/113 |
| 5,131,064 A * | 7/1992 | Arroyo et al. | ........ | 385/102 |
| 5,193,134 A * | 3/1993 | Pizzorno et al. | ........ | 385/105 |
| 5,384,880 A * | 1/1995 | Keller et al. | ........ | 385/109 |
| 5,748,823 A * | 5/1998 | Nave | ........ | 385/113 |
| 5,761,362 A * | 6/1998 | Yang et al. | ........ | 385/109 |
| 6,137,936 A * | 10/2000 | Fitz et al. | ........ | 385/113 |
| 6,324,324 B1 * | 11/2001 | Dixon et al. | ........ | 385/100 |
| 6,415,090 B1 * | 7/2002 | Taylor et al. | ........ | 385/128 |
| 6,430,344 B1 * | 8/2002 | Dixon et al. | ........ | 385/109 |
| 6,487,345 B1 * | 11/2002 | Dixon et al. | ........ | 385/100 |
| 6,493,491 B1 * | 12/2002 | Shen et al. | ........ | 385/113 |
| 6,594,427 B1 * | 7/2003 | Dixon et al. | ........ | 385/109 |
| 6,611,646 B1 * | 8/2003 | Norris et al. | ........ | 385/113 |
| 6,721,480 B1 * | 4/2004 | Bocanegra et al. | ........ | 385/114 |
| 6,778,744 B2 * | 8/2004 | Norris et al. | ........ | 385/113 |
| 6,778,745 B2 * | 8/2004 | Debban et al. | ........ | 385/114 |
| 6,801,695 B2 * | 10/2004 | Lanier et al. | ........ | 385/100 |
| 6,836,603 B1 * | 12/2004 | Bocanegra et al. | ........ | 385/113 |
| 6,925,235 B2 * | 8/2005 | Lanier et al. | ........ | 385/100 |
| 6,934,452 B2 * | 8/2005 | Bocanegra et al. | ........ | 385/114 |
| 6,973,245 B2 * | 12/2005 | Bocanegra et al. | ........ | 385/102 |
| 7,171,087 B2 * | 1/2007 | Takahashi | ........ | 385/106 |
| 2002/0009272 A1 * | 1/2002 | Parris | ........ | 385/109 |
| 2002/0118933 A1 * | 8/2002 | Dixon et al. | ........ | 385/109 |
| 2003/0044139 A1 * | 3/2003 | Norris et al. | ........ | 385/113 |
| 2004/0091221 A1 * | 5/2004 | Debban et al. | ........ | 385/114 |
| 2005/0089285 A1 * | 4/2005 | Bocanegra et al. | ........ | 385/114 |
| 2005/0141831 A1 * | 6/2005 | Bocanegra et al. | ........ | 385/100 |

\* cited by examiner

*Primary Examiner*—Frank G Font
*Assistant Examiner*—Peter Radkowski
(74) *Attorney, Agent, or Firm*—Peter V. D. Wilde

(57) ABSTRACT

Described are new cable designs for indoor installations wherein the cable comprises a dual-layer optical fiber buffer encasement of acrylate resin. The buffer encasement has an acrylate compliant inner layer that protects the fiber and minimizes stress transfer to the fiber; and a hard, tough acrylate outer layer that provides crush resistance. The dual-layer optical fiber buffer encasement is wrapped with reinforcing yarn and encased in an outer protective jacket.

16 Claims, 2 Drawing Sheets

OPTICAL FIBER CABLES

RELATED APPLICATIONS

This application claims the benefit of provisional application 60/917,953 filed May 15, 2007, which is incorporated herein by reference.

FIELD OF THE INVENTION

This invention relates to optical fiber cables.

BACKGROUND OF THE INVENTION (Parts of this Background May or May not Constitute Prior Art.) Conventional optical fiber cables for indoor use typically provide a convenient termination for standard single-fiber connectors, such as ST, SC or LC connectors, often using tight buffered optical fiber with an outer diameter of 900 microns. However, multifiber connectors are becoming increasingly popular in order to save space and installation labor. These connectors use multi-fiber "MT" ferrules. 12-fiber multifiber connectors with a "MT" type ferrule can be used for connection of twelve 250 micron fibers in the same space normally needed for 2 traditional SC connections, or 3 traditional LC connections. Commercially available multifiber connectors include MTP® connectors from US Conec (www.usconec.com), and MPO connectors from Furukawa America (http://www.furukawaamerica.com/resource/MPO 0305.pdf) or Tyco Electronics (www.tycoelectronics.com).

These types of multifiber connectors are designed to work with flat optical ribbons. However, use of flat ribbons in cable may lead to undesirable cable performance in the field, e.g., difficult cable handling and routing in the field. Flat cables are prone to twisting and kinking. If, on the other hand, a flat ribbon is placed in a round cable, the cable must be fairly large and bulky in order to fit the flat ribbon within a robust round structure. For example, a 12-fiber ribbon, made using 250 micron fibers, is typically 3.1 mm wide; placing jacketing and reinforcement over that ribbon leads to a round cable in excess of 5 mm in diameter: an undesirably large cable.

To address these problems with ribbon cable, some providers of multifiber connectors offer compact, round, indoor optical cables using unribboned, colored, loose, 250 micron fiber. Colored 250 micron fiber resembles the type of fiber often used in outside plant cables. The individual 250 micron fibers can be packed very tightly into a profile that is substantially round, thus allowing packaging those fibers in a small round cable.

Commercial examples of this sort of cable include the "Premise MicroCore" cable, by AFL Telecommunications
(http://www.afltele.com/resource%20center/specifications/fiberopticcable/pdfs/Subunitized_Premise_MicroCore.pdf)

and Corning "MIC250" cables. The AFL 12-fiber cable is 4.5 mm in diameter; the Corning cable is 4.4 mm in diameter. Both of these cables can be used as subunits for higher fiber count cables; the AFL design may have as many as 72 fibers, while the Corning design is offered with 24 fibers.

However, multifiber connectors that use MT ferrules are designed to accept flat ribbons, so special accommodations are made for round, loose fiber cables with multifiber connectors. For example, the loose fiber may be 'ribbonized' prior to use with MT-type multifiber ferrules. Commercial kits for ribbonization are available from, for example, US Conec. In factory ribbonization, the individual fibers may be broken out from the end of the small, round cable, and formed into a short 'ribbon' using either a UV-cured resin or engineered adhesive tapes. After the fibers are ribbonized, they may be terminated with the multifiber connector. This approach requires extra time in connectorization, but provides a terminated multifiber jumper with reduced size and improved handling for field installation.

However, the round cable designs just described have several drawbacks:

1. Poor fiber management. The colored, 250 micron fibers are loosely laid inside the cable with aramid yarn reinforcement. When the cable jacket is opened, the fibers are randomly organized, and randomly mixed with strands of aramid yarn. In the ribbonizing process, the operator cuts or folds back the aramid yarn to expose the fiber, then picks out the fibers in the order required for ribbonizing. This is a tedious process. In addition, the fibers are free to twist, and change locations, when the cable is stretched, bent, etc.
2. Poor fiber protection. The fibers are prone to being damaged during the ribbonizing process. In these cable designs there is little mechanical protection for the fibers when the cable is opened, and the operator must take extreme care to ensure no fibers are damaged when the aramid yarn is removed and the fibers are ordered one-by-one for ribbonizing.
3. Poor crush protection. The hollow core and bare-fiber structure of these cables means that crushing loads may be translated directly to the fibers. When crushed, the fibers may be pressed one against another. Moreover, the organization of the fibers relative to each other can be rearranged. These effects may result in high point attenuation and/or broken fibers, and limits the suitability of these cables for many indoor applications. While these cables may be adequate for frame-to-frame interconnect applications, where they are installed in a relatively benign environment, they may not be sufficiently robust for installation in overhead or under-floor ladder racks, or raceways for room-to-room connections.

STATEMENT OF THE INVENTION

To address these problems, we propose a new cable structure for indoor installations comprising a dual-layer optical fiber buffer encasement of acrylate resin. The buffer encasement comprises a compliant acrylate inner layer that protects the fiber and minimizes stress transfer to the fiber, and a hard, tough acrylate outer layer that provides crush resistance. The dual-layer optical fiber buffer encasement is wrapped with reinforcing yarn and encased in an outer protective jacket.

DETAILED DESCRIPTION

Figure 1:
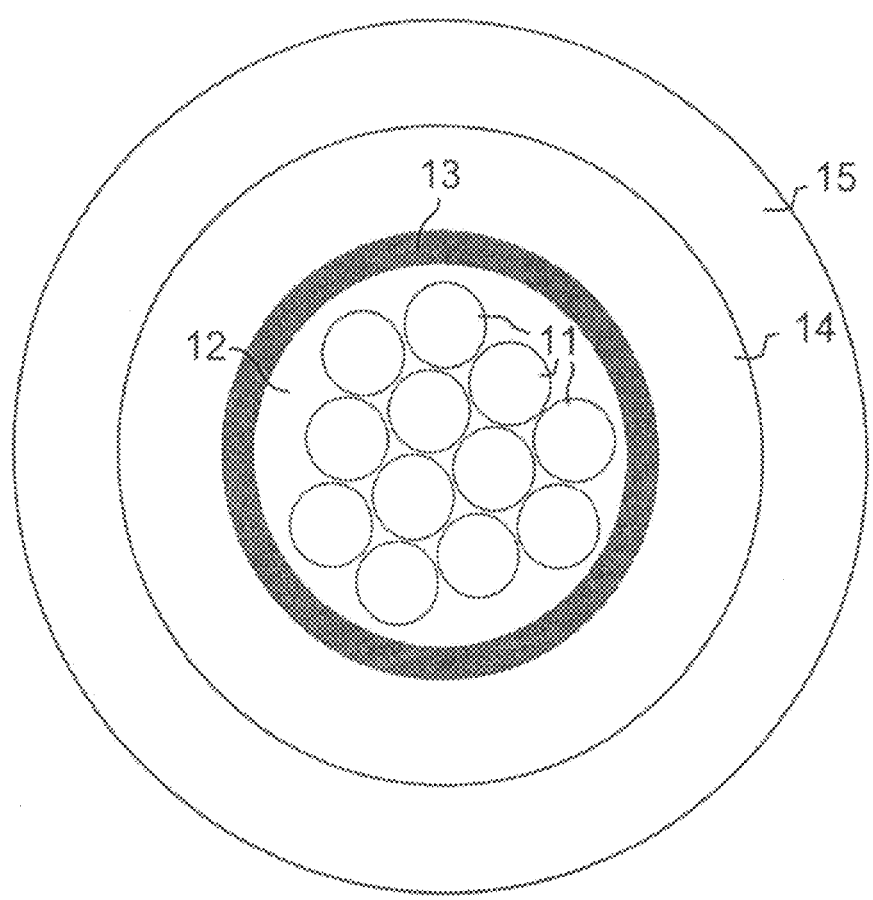
FIG. 1 is a schematic view of a cable design of the invention showing the dual-layer optical fiber buffer encasement, the aramid yarn layer and the outer jacket.

Referring to FIG. 1, a twelve fiber embodiment of the invention is shown with the twelve optical fibers 11, encased and embedded in a soft acrylate matrix 12. The elements in the figures are not drawn to scale. Surrounding and encasing the soft acrylate matrix is a relatively hard acrylate encasement layer 13. Together, the optical fibers, the acrylate matrix, and the acrylate encasement layer, comprise a round dual layer optical fiber buffer encasement. In this embodiment the optical fiber buffer encasement contains 12 optical fibers, but may contain from 2-24 optical fibers. Optical fiber buffer encasements with 4 to 12 optical fibers may be expected to be most common in commercial practice.

The dual-layer acrylate construction of the optical fiber buffer encasement, with the soft inner layer and hard outer layer, functions to minimize transfer of bending and crushing forces to the optical fibers, thus minimizing signal attenuation. Alternatively the optical fiber buffer encasement may have an oval cross section.

The term matrix is intended to mean a body with a cross section of matrix material in which other bodies (optical fibers) are embedded. Encasement is intended to mean a layer that both surrounds and contacts another body or layer.

The soft acrylate matrix and the hard acrylate encasement are preferably UV-curable acrylates. Other polymers may be substituted. The UV-curable resins may contain flame-retardants to improve the overall fire resistance of the cable.

Alternatively, a polymeric layer may be extruded over the dual layer optical fiber buffer encasement, and may be useful in especially demanding applications, such as cables required to meet the NFPA 262 Plenum fire standard. The extruded flame-retardant coating may be made from: PVC, low-smoke PVC, PVDF, FEP, PTFE, compounded fluoropolymer blends, low-smoke zero halogen polyolefin-based resins, flame retardant thermoplastic elastomers, and flame retardant nylons. Specific examples are Dow Chemical DFDE-1638-NT EXP2 non-halogen resin, and Dyneon SOLEF 32008/0009 PVDF.

The optical fiber buffer encasement is encased with a wrap 14 of reinforcing yarn, preferably polyaramid, although glass yarn could be used. The yarn may be run straight or may be helically twisted. For indoor-outdoor applications, the aramid yarn may be coated with a waterswellable finish that can prevent water penetration down the length of the cable. Other waterblocking provisions, such as tapes, yarns, or powders, may also be used to limit water penetration.

An outer flame-retardant polymer jacket 15 is formed around the buffer encasement and the reinforcing yarn. Suitable jacket polymers are PVC, low-smoke PVC, PVDF, FEP, PTFE, compounded fluoropolymer blends, low-smoke zero halogen polyolefin-based resins, flame retardant thermoplastic elastomers, and flame retardant nylons. The jacket polymer may contain UV stabilizers to allow use of the cable for indoor-outdoor applications.

An advantage of using UV-cured acrylates in the dual-layer acrylate buffer encasement is that the cabling operation used to apply UV-cured coatings is rapid and cost effective. The following describes the production of the dual-layer acrylate buffer encasement at high cabling speeds. The method used is to apply the coating material as a prepolymer, and cure the prepolymer using UV light. The dual-layer acylate coatings are applied in tandem or simultaneously (using a two compartment dual die applicator). In the tandem method, a first coating layer is applied, and cured, and the second coating layer is applied over the cured first layer, and cured. In the simultaneous dual coating arrangement, both coatings are applied in a prepolymer state, and cured simultaneously. The UV curable polyacrylate prepolymers are sufficiently transparent to UV curing radiation, i.e., wavelengths typically in the range 200-400 nm, to allow full curing at high draw speeds. Other transparent coating materials, such as alkyl-substituted silicones and silsesquioxanes, aliphatic polyacrylates, polymethacrylates and vinyl ethers have also been used as UV cured coatings. See e.g. S. A. Shama, E. S. Poklacki, J. M. Zimmerman "Ultraviolet-curable cationic vinyl ether polyurethane coating compositions" U.S. Pat. No. 4,956,198 (1990); S. C. Lapin, A. C. Levy "Vinyl ether based optical fiber coatings" U.S. Pat. No. 5,139,872 (1992); P. J. Shustack "Ultraviolet radiation-curable coatings for optical fibers" U.S. Pat. No. 5,352,712 (1994). The coating technology using UV curable materials is well developed. Coatings using visible light for curing, i.e. light in the range 400-600 nm, may also be used. The preferred coating materials are acrylates, or urethane-acrylates, with a UV photoinitiator added.

Examples of coating materials suitable for use in the optical fiber buffer encasement of the cables of the invention are:

| | INNER LAYER | OUTER LAYER |
|---|---|---|
| Example 1 | DSM Desotech DU-1002 | DSM Desotech 850-975 |
| Example 2 | DSM Desotech DU-0001 | DSM Desotech 850-975 |
| Example 3 | DSM Desotech DU-1003 | DSM Desotech 850-975 |

The inner layer and outer layer materials may be characterized in various ways. From the general description above it is evident that the modulus of the inner layer should be less than the modulus of the outer layer. Using the ASTM D882 standard measurement method, the recommended tensile modulus for the inner layer is in the range 0.1 to 50 MPa, and preferably 0.5 to 10 MPa. A suitable range for the outer layer is 100 MPa to 2000 MPa, and preferably 200 MPa to 1000 MPa.

The layer materials may also be characterized using glass transition temperatures. It is recommended that the $T_g$ of the inner layer be less than 20 degrees C., and the $T_g$ of the outer layer greater than 40 degrees C. For the purpose of this description the glass transition temperature, Tg, is the point in the middle of the transition curve.

Suitable aramid yarn for the aramid layer is available from Teijin Twaron BV, identified as 1610 dTex Type 2200 Twaron yarn. The yarn may be run straight or with a twist.

The cable dimensions are largely determined by the size of the dual-acrylate subunit. A typical diameter for the 12 fiber buffer encasement described above is 1.425 mm. In most embodiments the buffer encasement diameter, for 2 to 12 fibers, will be less than 2 mm. The reinforcing yarn layer and the outer jacket typically add 1.5 to 2.5 mm to the cable diameter. The outer jacket may be, for example, 10-25 mils. The overall cable diameter is preferably less than 4 mm. In a preferred embodiment for use in applications requiring a plenum fire rating, a 25-mil thick jacket of Dyneon SOLEF 32008/0009 may be used, providing a final outer cable diameter of 3.4 mm.

Figure 2:
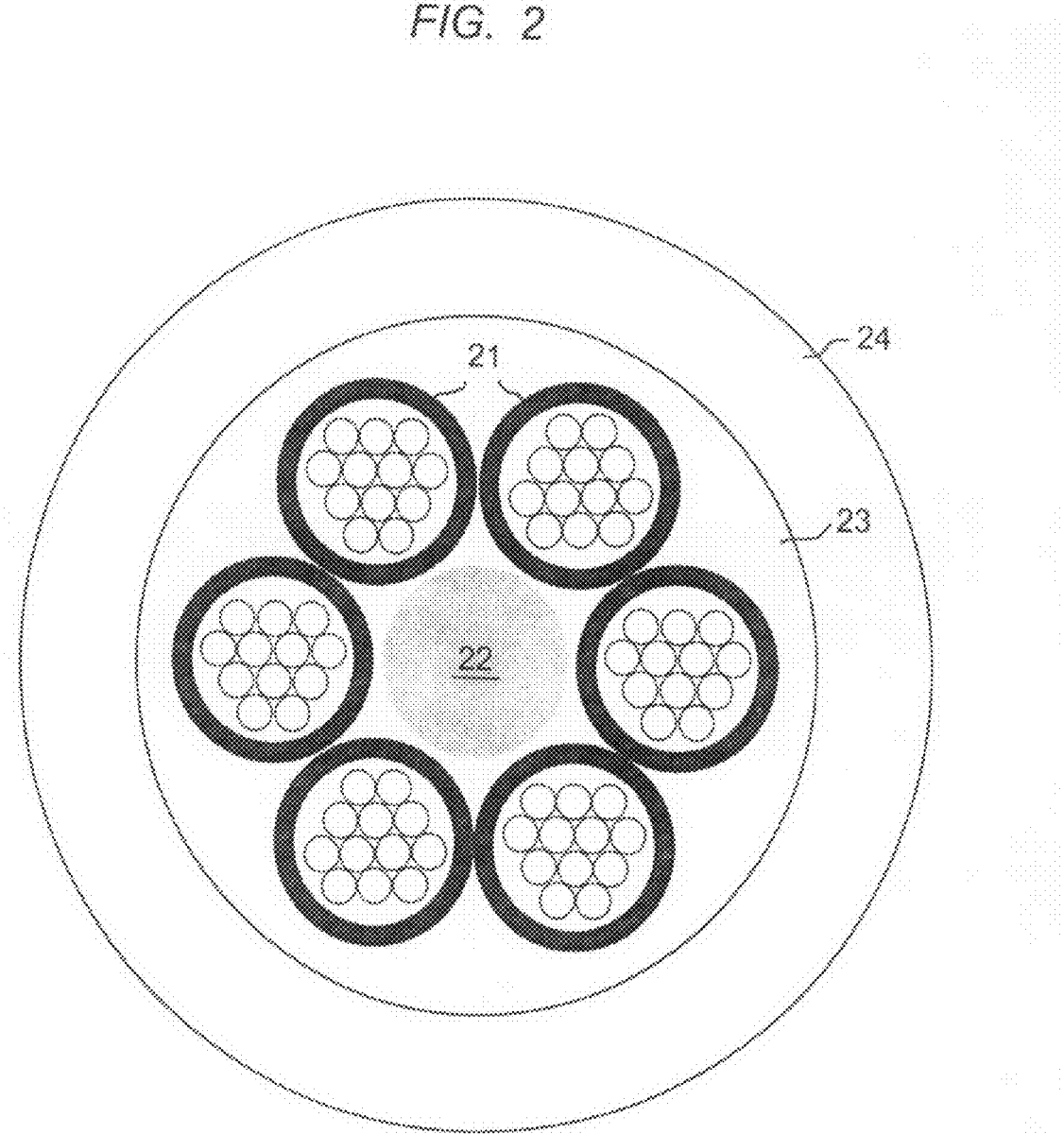
FIG. 2 is a schematic view of a larger fiber count cable wherein a plurality of dual-layer optical fiber buffer encasements are cabled together.

Optical fiber cables with more than one optical fiber buffer encasement offer an attractive alternative design, one that produces increased fiber count while still relatively small and compact. Buffer encasements of any number, for example 2-8, can be combined in a single jacket. Efficient packing is obtained in a cable with 6 optical fiber buffer encasements 21, as shown in FIG. 2. This design has a central strength member 22 to aid in organizing the buffer encasements, within the aramid yarn layer 23 and outer jacket 24. Alternatively, the center space may be occupied by another optical fiber buffer encasement. As mentioned above, the individual optical fibers may be color coded to aid in identifying and organizing the optical fibers for ribbonizing or splicing. In the embodiment shown in FIG. 2, the cable jackets may also be color coded to provide additional aid in organizing the optical fibers.

Referring back to the three disadvantages of other optical fiber cable designs that were mentioned earlier, corresponding advantages of the cables just described are:

1. Improved fiber management. The fibers are contained within a solid buffer encasement that prevents twisting, mixing or kinking. It is convenient to strip the aramid yarn away from the buffer encasement, since the encasement is a solid unit. The order and relative location of the fibers are fixed when the dual-layer acrylate buffer encasement is manufactured. The individual fibers may be exposed for ribbonizing using known techniques for accessing similar round acrylate units. The fibers are easier to ribbonize as they are bound together in the buffer encasement. The individual optical fibers may be color coded to aid in identification and ribbonizing.
2. Improved fiber protection. The fiber is buffered in the use environment by the hard and soft UV acrylate layers. This provides mechanical protection against fiber breaks during cable stripping and handling.
3. Improved crush protection. The optical fiber buffer encasement offers improved crush resistance due to its solid structure. The hard outer layer and soft inner layer provides hydrostatic resistance to crushing loads, and the soft inner layer acts to dissipate the crushing energy.

In addition, the compact size of the optical fiber buffer encasement allows for manufacture of smaller cables than typically found in competing cable designs. For example, the cable design of the invention allows production of riser/non-halogen cables with an OD of 3.3 mm or less, and plenum-rated cables with an OD of 3.7 mm or less.

It is mentioned above that the optical fiber cable of the invention is primarily adapted for indoor installation, i.e. in a protected environment. The cable design is especially unique for that application. However the design may be readily modified for outdoor use, for example in campus environments where the cable may be used to connect two adjacent buildings. Reference to "indoor-outdoor above is meant to convey applications that are either indoor or outdoor, as well as applications where a single cable may be partly indoors and partly outdoors. The latter provides an installation advantage since the junction connector usually found at the location where a cable enters a premises may be omitted.

It should also be evident from the foregoing description that the buffer encasement comprises a subunit of the cable in the sense that is separately prepared as a subassembly of optical fibers, then cabled in a protective yarn and a protective jacket.

It will be evident to those skilled in the art that UV cured acrylate resins contain photoinitiators that can be identified in the final cable product. Any suitable photoinitiator may be used in implementing the invention.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. An optical fiber cable comprising:
   (a) an optical fiber buffer encasement comprising:
      i. at least two optical fibers encased in a polymer matrix, the polymer matrix comprising a UV cured resin having a modulus range 0.1 to 50 MPa,
      ii. a polymer layer encasing the polymer matrix, the polymer layer having a modulus greater than the modulus of the polymer matrix,
   (b) a layer of high-strength polymer yarn surrounding optical fiber buffer encasement, and
   (c) a cable jacket surrounding the layer of polymer yarn, the cable jacket having a round cross section.

2. The optical fiber cable of claim 1 wherein both the polymer matrix and the polymer layer comprise UV cured acrylates.

3. The optical fiber cable of claim 1 wherein the modulus of the polymer matrix is in the range 0.5 to 10 MPa.

4. The optical fiber cable of claim 1 wherein the modulus of the polymer layer is in the range 100 MPa to 2000 MPa.

5. The optical fiber cable of claim 3 wherein the modulus of the polymer layer is in the range 200 MPa to 1000 MPa.

6. The optical fiber cable of claim 2 wherein the glass transition temperature of the polymer matrix is less than 20 degrees C.

7. The optical fiber cable of claim 6 wherein the glass transition temperature of the polymer layer is greater than 40 degrees C.

8. The optical fiber cable of claim 2 wherein the polymer yarn is polyaramid.

9. The optical fiber cable of claim 1 wherein the cross section of the cable jacket has a diameter of less than 4 mm.

10. The optical fiber cable of claim 1 wherein the optical fiber cable comprises more than one optical fiber buffer encasements.

11. The optical fiber cable of claim 2 wherein the optical fibers are color-coded.

12. The optical fiber cable of claim 10 wherein the buffer encasements are color-coded.

13. The optical fiber cable of claim 2 wherein the buffer encasement is coated with flame retardant material.

14. The optical fiber cable of claim 2 wherein the cross section of the buffer encasement is essentially round.

15. The optical fiber cable of claim 2 wherein the cable jacket comprises flame retardant material.

16. A method for installing optical fiber cable inside a customer premises by the step of connecting the cable to the interior of the premises, the method characterized in that the optical fiber cable comprises:
   (a) an optical fiber buffer encasement comprising:
      i. at least two optical fibers encased in a polymer matrix, the polymer matrix comprising a UV cured resin having a modulus range 0.1 to 50 MPa,
      ii. a polymer layer encasing the polymer matrix, the polymer layer having a modulus greater than the modulus of the polymer matrix,
   (b) a layer of high-strength polymer yarn surrounding optical fiber buffer encasement, and
   (c) a cable jacket surrounding the layer of polymer yarn, the cable jacket having a round cross section.

* * * * *